Sept. 4, 1928.
E. G. GUNN
1,682,783
MOTOR VEHICLE BRAKE
Filed June 30, 1920
2 Sheets-Sheet 1
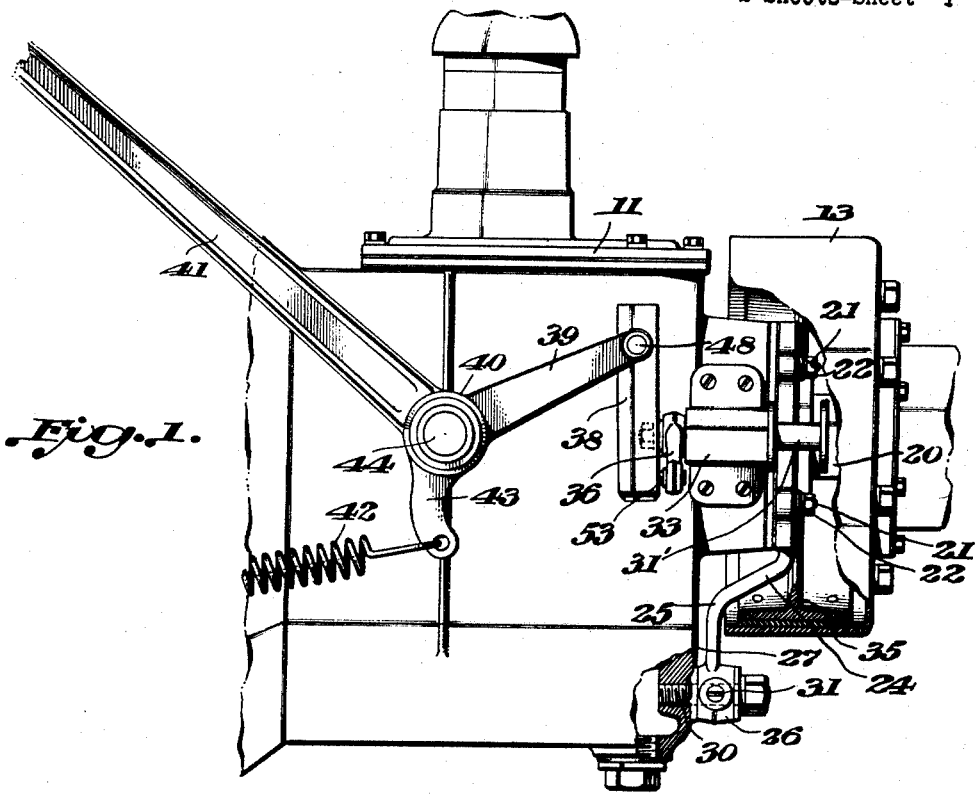
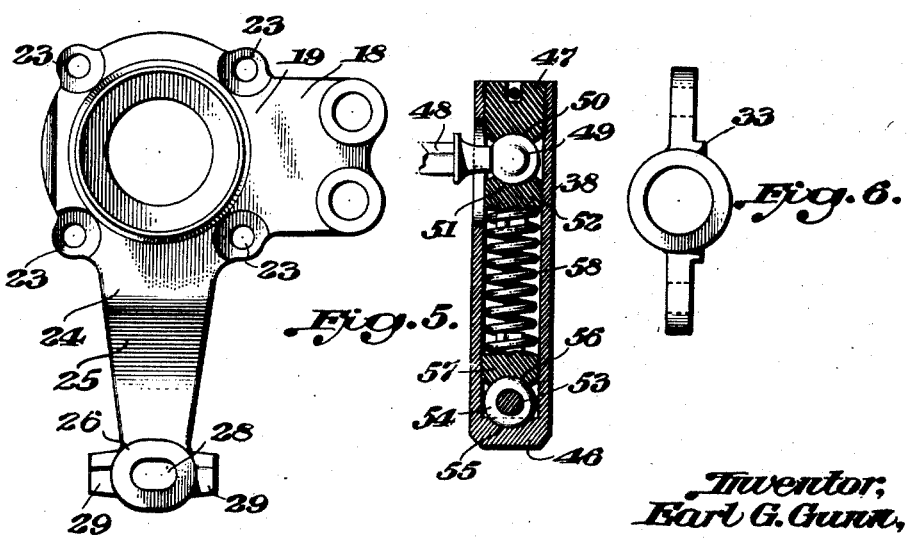
Inventor,
Earl G. Gunn,
By Milton Sibbitts
Atty.

Sept. 4, 1928.  
E. G. GUNN  
MOTOR VEHICLE BRAKE  
Filed June 30, 1920    2 Sheets-Sheet 2

Inventor,
Earl G. Gunn,
By Milton Tibbetts Atty.

Patented Sept. 4, 1928.

1,682,783

UNITED STATES PATENT OFFICE.

EARL G. GUNN, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE BRAKE.

Application filed June 30, 1920. Serial No. 393,004.

This invention relates to motor vehicles and more particularly to brake mechanism therefor.

One common form of brake mechanism used on motor vehicles is that known as the expanding type in which a plurality of movable or pivoted brake shoes are adapted to engage a rotary brake member or drum.

In order that this type of brake shall operate efficiently, it is essential that the actuating means for the brake shoes be positioned centrally with respect to the shoes and that the shoes be centered or be initially spaced equal distances from the drum, whereby the actuating means will operate with equal effectiveness upon all of the brake shoes.

One of the objects of the invention is, therefore, to so position the brake shoes with respect to the drum and actuating means that the actuating means will operate with equal effectiveness upon all of the brake shoes.

Another object of the invention is to so adjust the brake shoes in their position of rest that they will be equally spaced from the brake drum.

Further objects will appear from the specification taken in connection with the drawings, and in which:

Fig. 1 is a view in side elevation and partly in section, illustrating brake mechanism constructed in accordance with my invention;

Fig. 4 is an enlarged detail view showing in elevation the bracket upon which the brake shoes are pivoted;

Fig. 5 is an enlarged sectional view showing the construction of the link which connects the operating lever to the brake shoe spreading mechanism; and Fig. 6 is an enlarged end elevation of the bracket or journal box in which the cam shaft is mounted.

Figure 2:
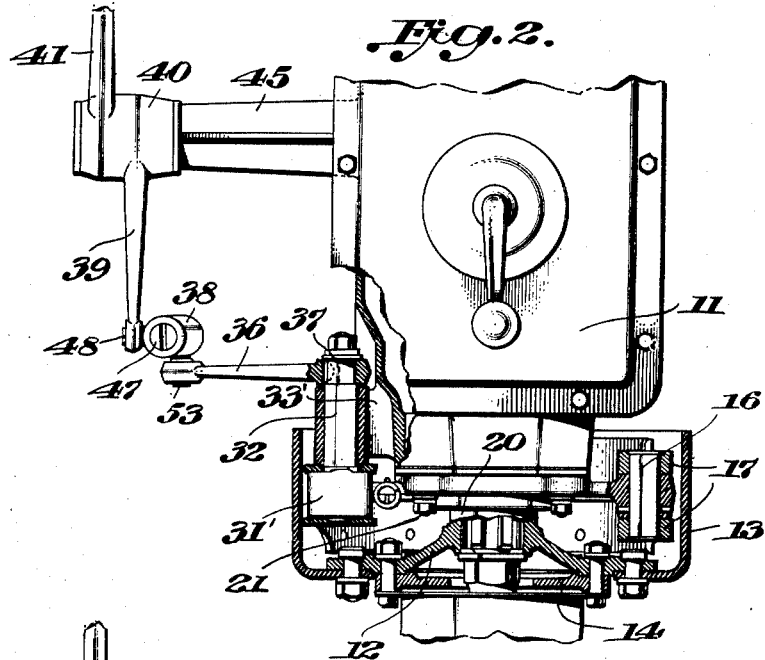
Fig. 2 is a view of the construction shown in Fig. 1 taken at right angles thereto and showing the brake mechanism in section.
Figure 3:
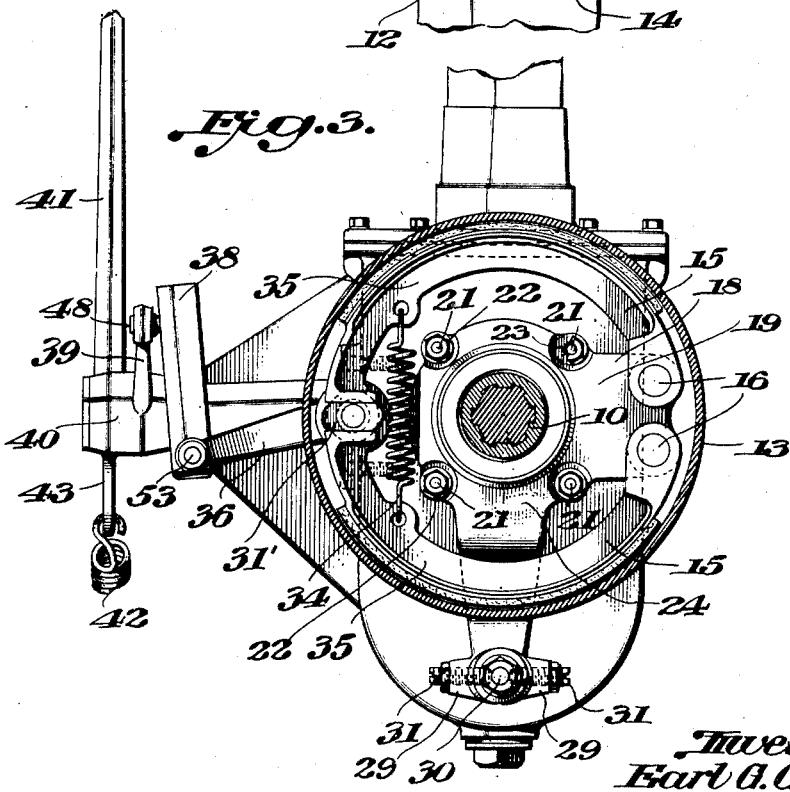
Fig. 3 is a transverse section of the construction shown in Fig. 2.

In the present instance the brake mechanism has been illustrated in the form developed for use on a motor vehicle, and the transmission shaft 10 of the vehicle is mounted in suitable bearings in the transmission case 11 and has splined to one end thereof a bell-shaped disk 12, Fig. 2, to which is secured a brake drum 13. It is customary in connection with the use of the device on motor vehicles to connect a universal joint 14 to the transmission shaft and in this instance such a joint is shown as secured to the disk 12.

In the embodiment of the invention illustrated, a pair of brake shoes 15 is pivoted within the drum 13 and suitable means is provided for expanding these shoes into contact or engagement with the brake drum.

Unless excessive care is taken in manufacturing and mounting these expansible brake elements, it is sometimes found that these elements are not properly centered or all equally spaced from the drum in their position of rest or inactive position. In order to obviate this difficulty and to overcome the necessity of such careful manufacturing, means have been provided for adjusting the brake shoes with respect to the brake drum so that the equal spacing of these shoes will be assured. As illustrated, the shoes 15 are mounted on pivot pins 16, the ends of the shoes being bifurcated, as shown at 17, and the pins 16 being carried by a portion 18 of a bracket 19, this bracket having the shape of a bell crank. The bracket 19 is rotatably mounted upon a hub 20, Fig. 2, of the disk 12 and is secured in fixed position by means of a plurality of bolts 21 and nuts 22, the bolts being carried by a portion of the transmission case 11. Particular attention is directed to the fact that the bolt holes 23 formed in the bracket 19 and through which the bolts 21 extend are considerably larger or have a larger diameter than the diameter of the bolts, whereby a limited movement of the bracket 19 on the hub 20 is permitted. The bracket 19 as shown in Fig. 4, has formed thereon an outwardly extending arm 24 disposed substantially at right angles to the arm or portion 18, and in the particular form of the invention shown, this arm extends downwardly and is offset, as shown at 25, Fig. 1, the lower portion 26 thereof extending in proximity to a portion 27 of the transmission case. The lower end 26 of the arm 24 has formed therein an elongated slot 28 and a pair of oppositely extending bosses 29, Fig. 4. A screw bolt 30 extends through the slot 28 into the portion 27 of the transmission case and holds the bracket in position, and means is provided for accurately determining the position of the bracket, this means comprising a pair of screws 31 which are threaded into the bosses 29 and engage the bolt 30. By loosening one screw and tightening the other the arm 24 and, of course, the rest of the bracket is rotated on the hub 20 or about the axis of the transmission shaft as a center, and it will be seen that this rotation also moves bodily the pivot pins 16 of the brake shoes. It will, of course, be understood that before this adjustment is made, the nuts 22 on the bolts 21 must be loosened in a cam shaft 32 rotatably mounted in a bracket Any suitable means may be provided for actuating the shoes and in this instance a cam 31' is utilized, the cam being carried by a camshaft 32 rotatably mounted in a bracket or journal boss 33, which in turn is secured to outwardly extending bosses 33' formed on the transmission case. The brake shoes are maintained in engagement with the cam by means of a spring 34 secured at its opposite ends to webs 35 formed on the brake shoes.

An arm 36 is secured to and keyed to the end of the cam shaft 32 opposite the cam, as shown at 37, and the opposite end of this arm is connected by a link 38 to an arm 39 formed on or secured to a hub 40 of a lever 41, this lever being normally retained in inoperative position by a spring 42 secured to an arm 43 formed on the hub 40 and at its opposite end secured to any suitable fixed portion of the frame (not illustrated).

The hub 40 of the lever 41 is rotatably mounted on a spindle 44 carried by a bracket 45 secured to or formed integral with the transmission case 11.

Inasmuch as the arm 36 operates substantially at right angles to the arm 39, the link 38 is connected to these arms by means of a universal joint, this construction being illustrated in detail in Fig. 5. The link is formed of a hollow tube having an end wall 46 at one end and at its opposite end having a plug 47 threaded thereinto. The pivot pin 48 which connects the arm 39 to the link has formed on one end a ball 49 which is disposed between a spherical bearing 50 formed in the plug 47 and a spherical bearing 51 formed in a plunger 52. The other pivot pin 53 which connects the link to the arm 36 has also formed thereon a ball 54 which is positioned between a spherical bearing 55 formed in the end wall 46 and a spherical bearing 56 formed in a plunger 57, a spring 58 being interposed between the two plungers 51 and 56 and retaining these plungers in engagement with the balls 49 and 54.

From the above description it will be seen that the bracket 19 forms a means for adjusting the pivots of the brake shoes relative to the actuating means. With the parts assembled in place as shown in the drawings but with the nuts 22 loosened, and the brake drum and brake shoes removed, the bracket 19 may be adjusted about the axis of the transmission shaft by the screws 31 to exactly the right position so that the shoes will be equally spaced from the drum and equally applied by the cam, and the nuts 22 may then be tightened to rigidly secure the bracket in its adjusted position.

While I have in the above specification described one specific embodiment of the invention, it will be understood that changes and modifications in the construction and arrangement of the various parts may be made without departing from the spirit or scope of the invention as expressed in the following claims.

What I claim and desire to secure by Letters Patent is:—

1. Brake mechanism including a brake drum, a supporting member, a bell-crank bracket movably secured to the supporting member, brake shoes adapted to engage the drum pivoted to one arm of the bracket, and means adjustably securing the other arm of said bracket to the supporting member.

2. Brake mechanism including a brake drum, a supporting member, a bracket having arms forming a bell-crank movably secured to said supporting member, brake shoes adapted to engage the drum and independently pivoted to one arm of the bracket, and means for adjustably moving the other arm of said bracket about the center of said brake drum.

3. In a motor vehicle, a transmission casing, a transmission shaft carried thereby, a brake drum, a supporting member carried by said casing, brake shoes pivoted on said supporting member, means for moving said brake shoes into engagement with said drum, and means for adjusting said supporting member on said casing.

4. In a motor vehicle, a transmission casing, a transmission shaft carried thereby, a brake drum, a supporting member adjustably mounted on said transmission casing, brake shoes pivoted on said supporting member, actuating means for said shoes, and means for adjusting said supporting member on said casing.

5. In a motor vehicle the combination with a fixed member, a shaft extending through the fixed member, a hub on the shaft, a brake drum supported by the hub, a supporting member mounted to rotate on the hub, brake shoes pivoted on the supporting member, means for adjusting and securing the supporting member to the fixed member and actuating means for the shoes.

6. In a motor vehicle, a transmission casing, a transmission shaft carried thereby, a hub on the shaft, a brake drum, a supporting member rotatably mounted on the hub, brake shoes pivoted on the supporting member, means for adjusting the supporting member, means for securing the supporting member in a fixed position on the casing and means for actuating the shoes.

In testimony whereof I affix my signature.

EARL G. GUNN.

CERTIFICATE OF CORRECTION.

Patent No. 1,682,783.  Granted September 4, 1928, to

EARL G. GUNN.

It is hereby certified that error appears in the printed specification of the above numbered patent requiring correction as follows: Page 2, line 9, strike out the words "a cam shaft 32 rotatably mounted in a bracket" and insert instead "order to permit the movement of the bracket"; and that the said Letters Patent should be read with this correction therein that the same may conform to the record of the case in the Patent Office.

Signed and sealed this 9th day of April, A. D. 1929.

(Seal)

M. J. Moore,
Acting Commissioner of Patents.